United States Patent
Iwabuchi

(10) Patent No.: US 6,321,780 B1
(45) Date of Patent: Nov. 27, 2001

(54) VALVE FOR CONTROLLING FLOW RATE OF GAS

(75) Inventor: Toshiaki Iwabuchi, Yabuzuka Honmachi (JP)

(73) Assignee: Benkan Corporation, Tokyo (JP)

( * ) Notice: Subject to any disclaimer, the term of this patent is extended or adjusted under 35 U.S.C. 154(b) by 0 days.

(21) Appl. No.: 09/594,030

(22) Filed: Jun. 15, 2000

(30) Foreign Application Priority Data

Jun. 17, 1999 (JP) .................................................. 11-171177

(51) Int. Cl.⁷ .............................. F16K 49/00; F16K 31/04
(52) U.S. Cl. .......................... 137/341; 251/251; 251/321; 251/356
(58) Field of Search ........................... 137/341; 251/251, 251/319, 320, 321, 356, 357

(56) References Cited

U.S. PATENT DOCUMENTS

| 4,610,423 | * | 9/1986 | Morino ................................... 251/25 |
| 5,636,652 | * | 6/1997 | Toschi et al. ............... 251/129.12 X |
| 5,915,410 | * | 6/1999 | Zajac ..................................... 137/341 |

* cited by examiner

Primary Examiner—Kevin Lee
(74) Attorney, Agent, or Firm—Birch, Stewart, Kolasch & Birch, LLP

(57) ABSTRACT

A valve has a valve body having a passage including a hole in which gas flows, a valve seat surrounding a port of the hole. A valve disc is provided for closing the port of the hole, and an actuator is provided for operating the valve disc in a sine curve motion. The valve includes an inside heater for heating the valve disc.

8 Claims, 12 Drawing Sheets

VALVE FOR CONTROLLING FLOW RATE OF GAS

BACKGROUND OF THE INVENTION

The present invention relates to a valve for controlling a flow rate of gas, and more particularly to a control valve proper for using in a discharge system and a supply system in a system for manufacturing semiconductors, liquid crystals and others.

In the discharge system of the semiconductor manufacturing system, a needle control valve is used for controlling the flow rate of gas. The needle valve is linearly operated by a diaphragm under the condition of a positioning device, or by a screw rotated by a motor.

In the discharge system of the semiconductor manufacturing system, it is required to control the process pressure of several torrs and cleaning pressure of several hundred torrs. The controllable range of the needle control valve is determined by the control characteristic of the needle and the range-ability (the ratio between a controllable maximum capacity coefficient and a controllable minimum capacity coefficient) of the needle. However, the range-ability of the needle valve is about 15–30 in the linear characteristic and about 50–100 in the equal percentage characteristic when the needle valve is controlled in linear proportion relation. Namely, the control range is narrow, so that a high pressure range can not be controlled by the needle valve.

On the other hand, it is required to shut the passage at a high speed smaller than 2 seconds in an emergency. However, if the needle valve is controlled at such a high speed, hunting occurs. As a result, the pressure fluctuation becomes large, which renders the needle valve impossible to control a minimum range.

The above described problems are not trouble for the needle valve only, other valves, for example the shut off valve, has the same problem.

In addition, since the conventional needle valve can not be used to shut off the passage, a shut off valve must be parallelly used.

SUMMARY OF THE INVENTION

Accordingly, a first object of the present invention is to provide a flow rate control valve in which a valve body can be operated at a high speed, the controllability of the valve body can be increased, increasing the solving power thereof, thereby satisfying the requirements for both of the high speed operation and the controllability in a high pressure range.

A second object of the present invention is to provide a flow rate control valve having a flow rate control function and a shut off function, and possible to control the pressure in a wide range such as the process pressure and cleaning pressure in the discharge system of the semiconductor manufacturing system, thereby providing an economical control valve.

A third object of the present invention is to provide a flow rate control valve which keeps a valve thrust even if the electric power is cut off, thereby preventing the gas from leaking.

According to the present invention there is provided a valve comprising, a valve body having a passage including a hole in which gas flows, a valve seat surrounding a port of the hole, a valve disc for closing the port of the hole, an actuator for operating the valve disc in a sine curve motion.

The valve disc has a closing portion engaged with the valve seat and a needle portion inserted in the hole in the passage.

The valve according to claim 1 further comprising an inside heater for heating the valve disc.

An outside heater is provided for heating parts of the valve body surrounding the valve seat and the valve disc.

A seal ring made of elastic material is provided on the closing portion so as to be pressed against the valve seat.

The actuator comprises a motor, a horizontal drive shaft as a driving shaft of the motor, an eccentric cam secured to the driving shaft, a slider connected to the valve disc and vertically moved by the eccentric cam.

These and other objects and features of the present invention will become more apparent from the following detailed description with reference to the accompanying drawings.

DETAILED DESCRIPTION OF THE PREFERRED EMBODIMENT

Figure 1:
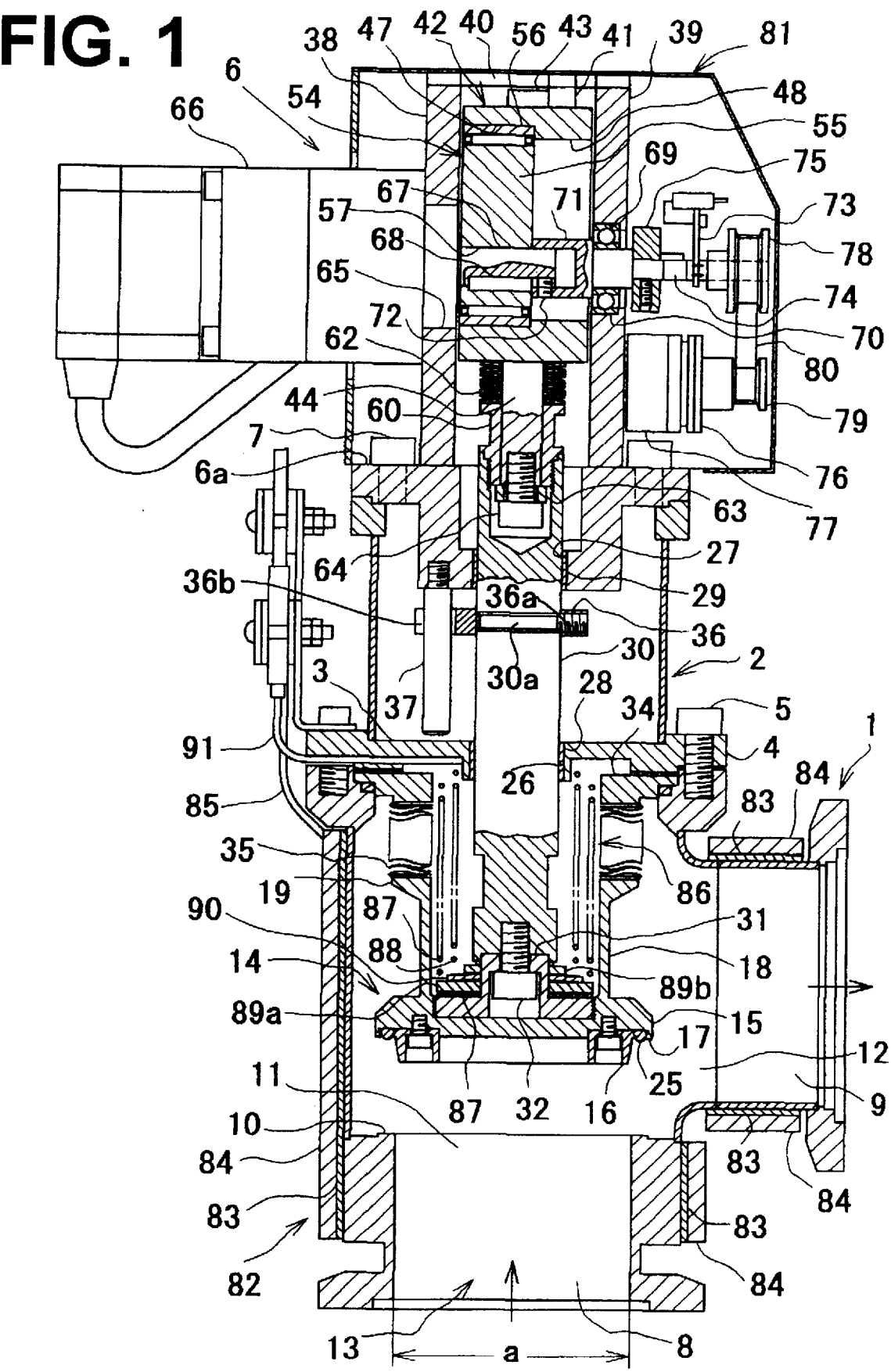
FIG. 1 is a sectional view of a flow rate control valve in accordance with the present invention as a first embodiment when the valve is opened.
Figure 2:
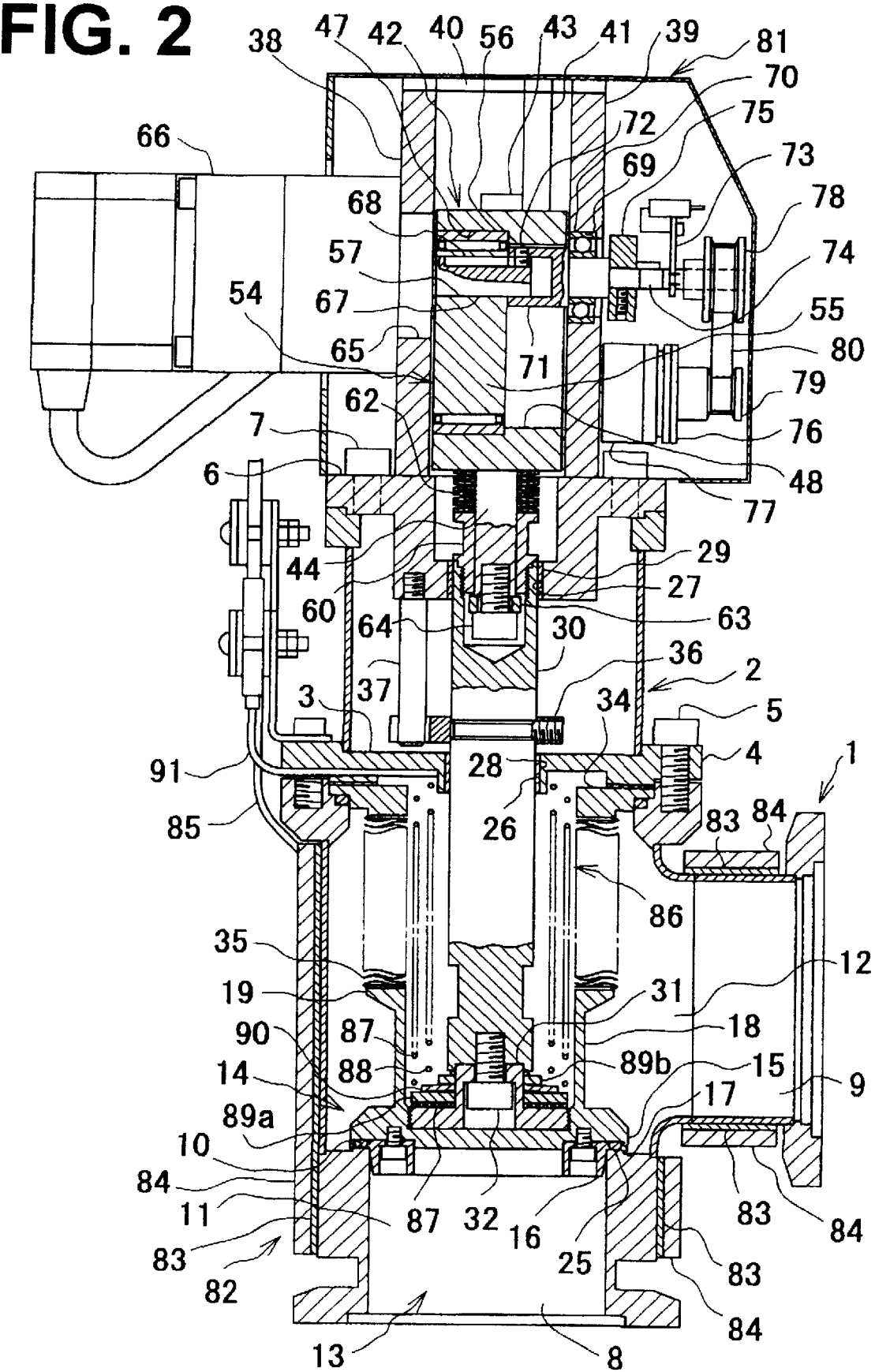
FIG. 2 is a sectional view of the valve of FIG. 1 when the valve is closed.
Figure 3:
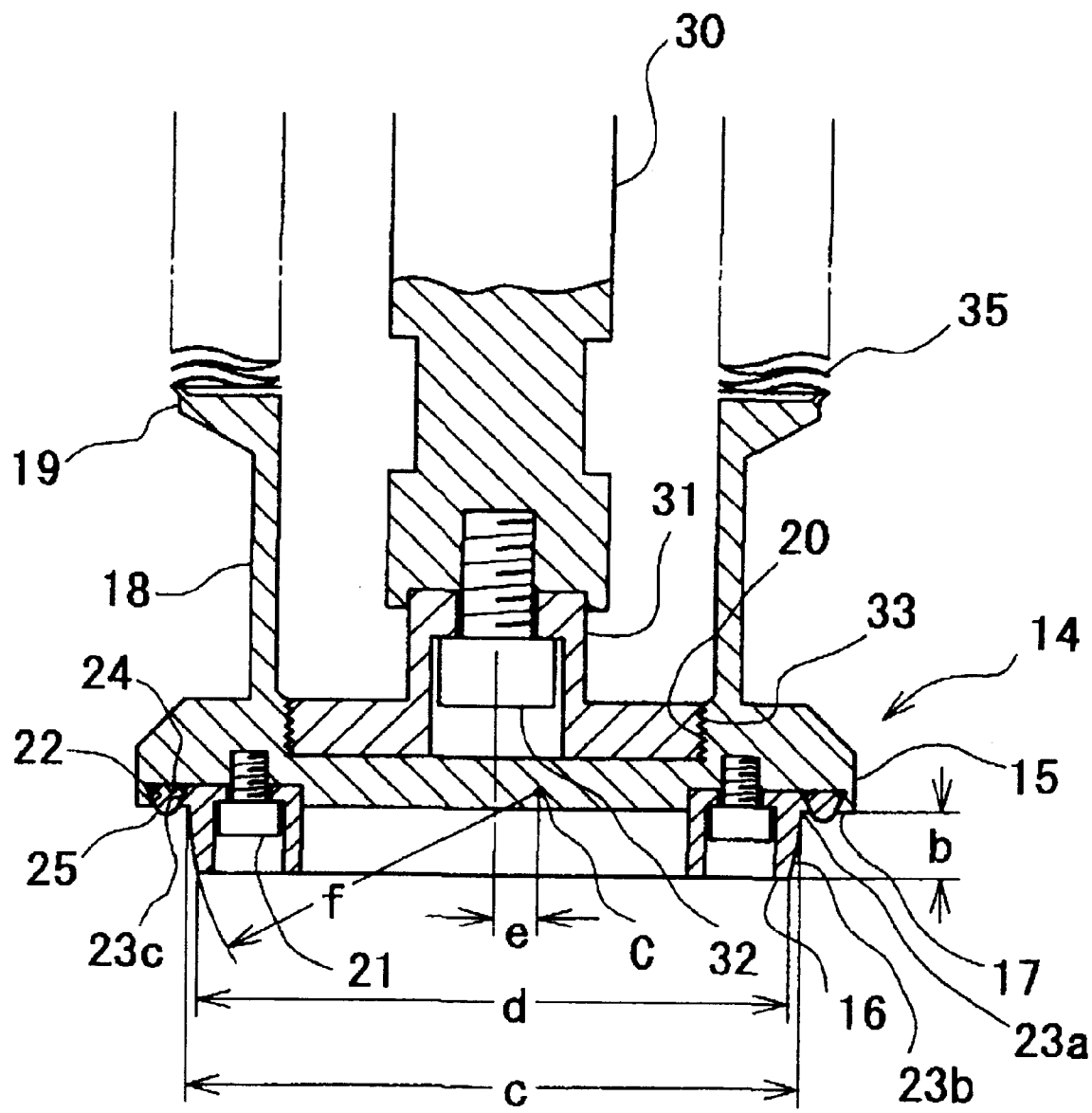
FIG. 3 is an enlarged sectional view of a part of the valve.

Referring to FIGS. 1 to 3, a flange 4 of a bottom plate 3 of a bonnet 2 is fixed to a top open portion of a valve body 1 by bolts 5. An actuator base 6a of an actuator 6 is secured to a top open portion of the bonnet 2 by bolts 7. Ports 8 and 9 are formed in the valve body 1. The port 8 is communicated with a hole 11, and a passage 13 is formed to communicate with the port 8, hole 11, valve chamber 12 and port 9. A valve seat 10 is provided to surround a port of the hole 11.

A valve disc 14 is provided in the valve chamber 12. The valve disc 14 comprises a closing portion 15 and an annular needle portion 16. The closing portion 15 has a disc shape and has an annular sealing edge 17 at the periphery thereof as shown in FIG. 3. A cylinder 18 is formed on a rear side of the closing portion 15, and a flange 19 is formed on a base portion thereof. On the inside wall of the closing portion, a female thread 20 is formed. The needle portion 16 has a diameter smaller than that of the sealing edge 17 and has a short cylindrical shape, and is secured to the front side of the closing portion 15 by bolts 21. The head of the bolt 21 is provided so as not to project from the front side of the needle portion 16. The inside wall of the sealing portion 17 is gradually expanded toward the base portion to form a holding surface 22.

On the base portion of the needle portion 16, a flange 23a is formed, and the peripheral wall of the needle is formed into a taper to provide a flow rate adjust surface 23b. The surface 23b is formed into a spheroid as shown in FIG. 3. The periphery of the flange 23a is tapered to form a holding surface 23c. The holding surfaces 22 and 23c form an annular groove 24 the width of which is gradually reduced toward the opening end. A seal ring 25 made of elastic material is engaged in the groove 24 so as to project a part of the periphery from the groove as shown in FIG. 3.

Referring to FIG. 1, a stem 30 is axially slidably mounted in a hole 26 of the base plate 3 of the bonnet 2 and a hole 27 of the actuator base 6a, interposing bushes 28 and 29 respectively. As shown in FIG. 3, a connector 31 is secured to the lower end of the stem 30 by a screw 32 and a male thread 33 of the connector 31 is engaged with the female thread 20 of the valve disc 14 so that the valve disc 14 is connected to the stem 30.

When the valve disc 14 is advanced together with the stem 30, the needle of the valve disc 14 is inserted into the hole 11 of the valve seat 10, and the seal ring 25 of the closing portion 15 is pressed against the valve seat 10, thereby closing the passage 13 as shown in FIG. 2.

A supporting member 34 is held between the underside of the base plate 3 of the bonnet 2 and the top of the valve body 1.

A bellows 35 is provided between the supporting member 34 and the flange 19 of the cylinder 18 by welding both ends thereof to the member 34 and the flange 19 so as to seal the valve disc 14.

An annular groove 30a is formed on the periphery of the stem 30, and a ring 36 is engaged in the groove and secured thereto by a screw 36a. The ring 36 has a bifurcation 36b in which a swivel stopper 37 secured to the actuator base 6a is inserted so as to present the stem 30 from swiveling.

As shown in FIG. 1, a pair of columns 38 and 39 are secured to the actuator base 6a at both sides of the stem 30, and a supporting plate 40 is secured to the tops of the columns.

Figure 4:
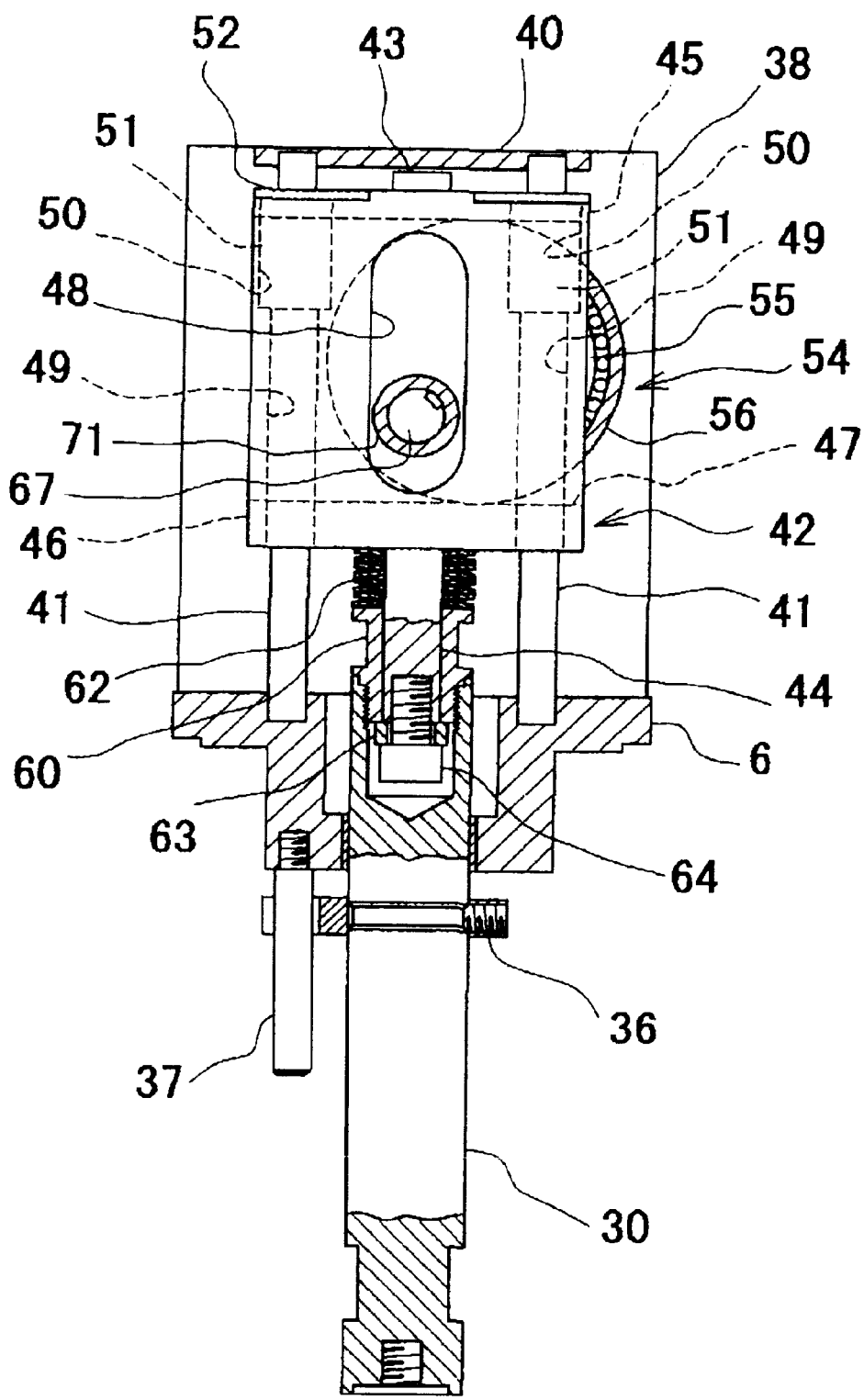
FIG. 4 is a side view of an actuator as viewed from the right side of FIG. 1.
Figure 5:
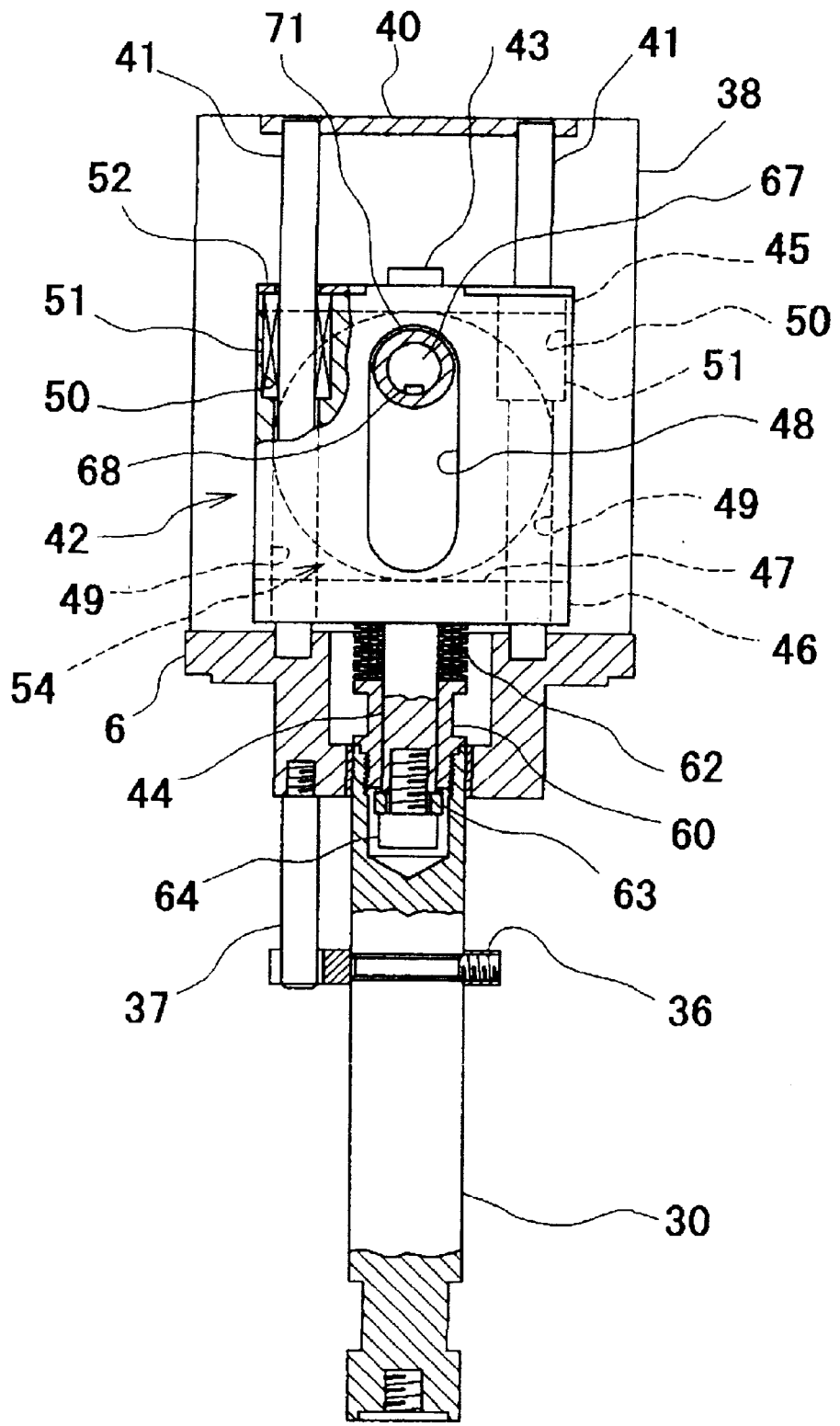
FIG. 5 is a side view of the actuator as viewed from the right side of FIG. 2.

Referring to FIG. 4, a pair of parallel guide shafts 41 are secured to the base 6a and the supporting plate 40 in the axial direction of the stem at the side of the column 39.

Figure 6:
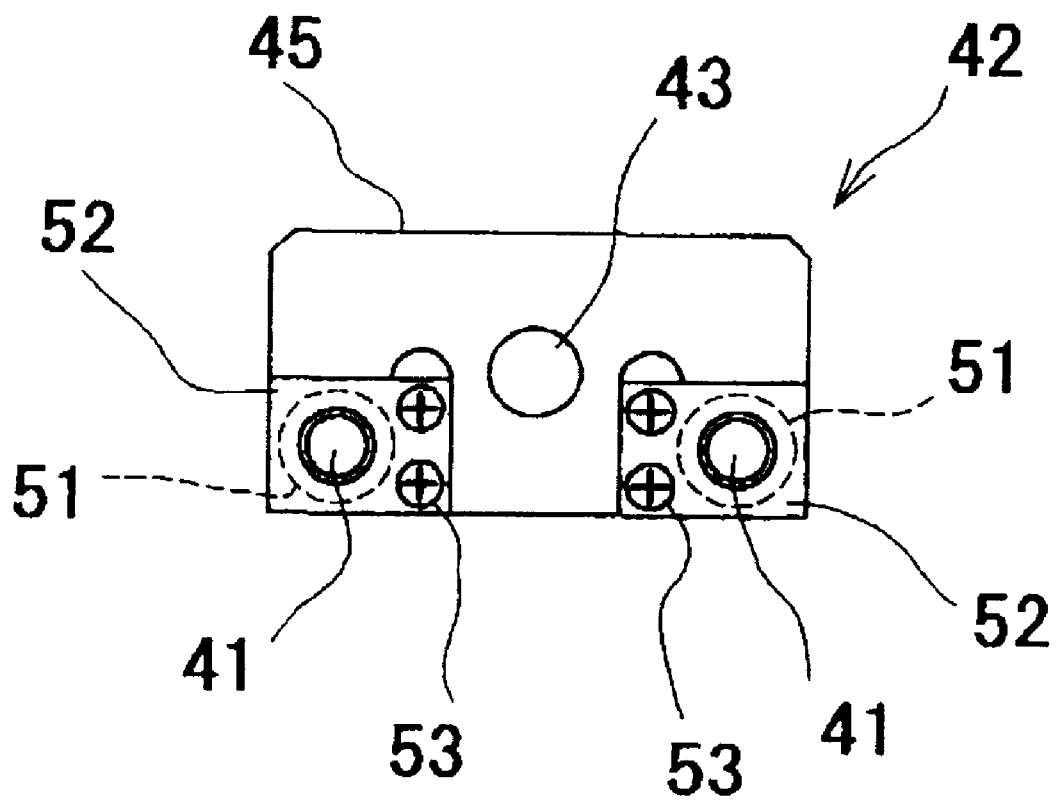
FIG. 6 is a plan view of a slider.
Figure 7:
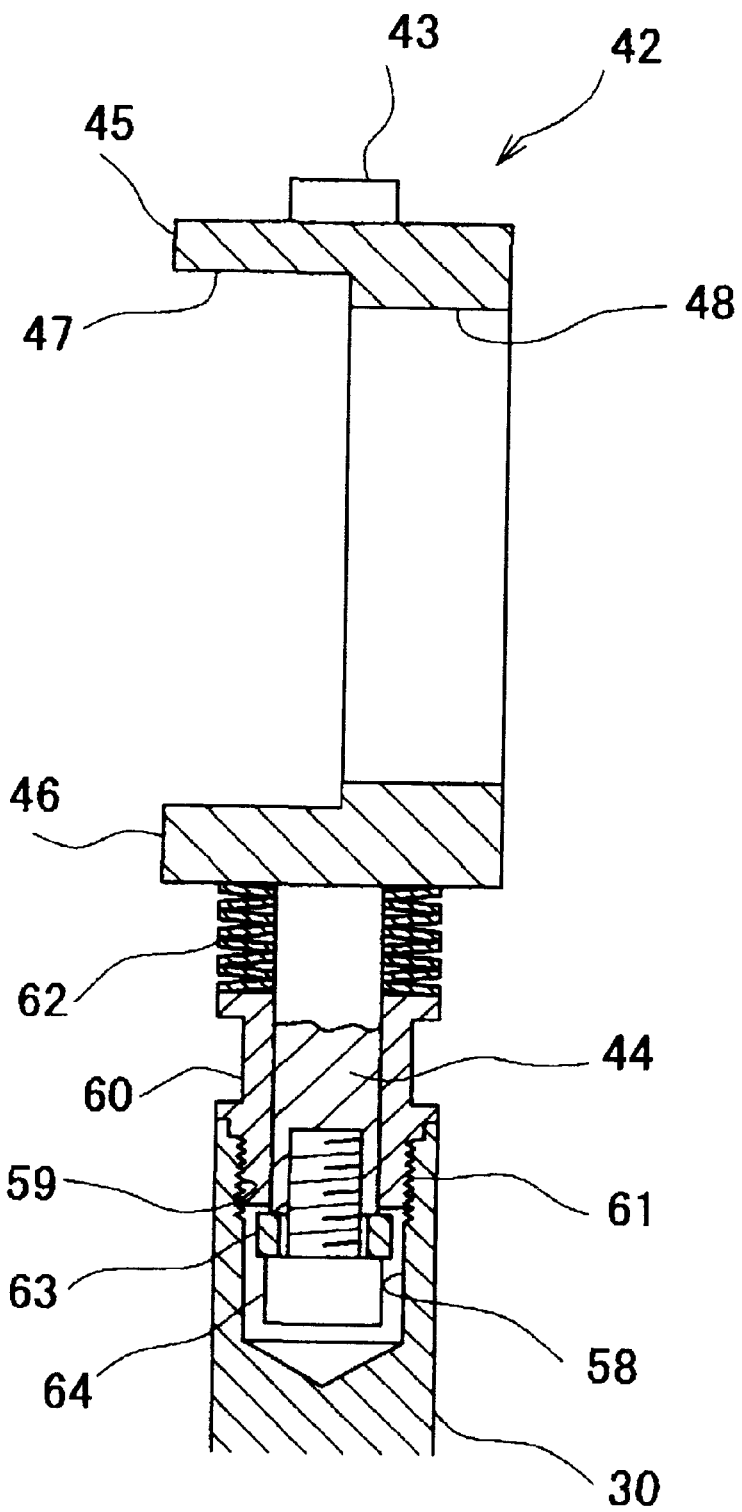
FIG. 7 is a sectional front view of the slider.

As shown in FIG. 7, a slider 42 has an upper shaft 43 and a lower shaft 44 projected from an upper supporting plate 45 and a lower supporting plate 46. Between the supporting plates 45 and 46, there is formed a recess 47 at the left side of the valve and a vertically elongated hole 48. As shown in FIG. 4, a pair of axially elongated holes 49 are formed on opposite sides of the elongated hole 48. In upper end portion of each hole 49, a large diameter hole 50 is formed, in which a linearbearing 51 is provided. The linearbearing 51 is held by a holding plate 52 fixed to the top of the slider 42 by a screw 53 as shown in FIG. 6. The slider 42 is mounted on the shafts 41 at the holes 49 and slidably held by the linearbearing 51.

Referring to FIGS. 1 and 4, an eccentric disc 55 having an eccentric hole 57 is provided in the recess 47 of the slider 42 and an eccentric cam 54 is rotatably mounted on the disc through a needle bearing 56 to provide the actuator. The eccentric cam 54 is rotated in the recess 47 as described hereinafter.

Referring to FIG. 7, an axial hole 58 having female screw 59 is formed in the top of the stem 30. A stem connector 60 is connected to the stem 30 by engaging a male screw 61 with the female screw 59. The stem connector 60 is axially slidably mounted on a shaft 44 of the slider 42. A plurality of Bélleville springs 62 are provided as a constant pressure mechanism disposed between the underside of the slider 42 and the top of the stem connector 60 to downwardly urge the stem 30 and the valve disc 14, so that the closing portion is pressed against the valve seat at a constant pressure.

A stopper ring 63 is secured to the lower end of the shaft 44 of the slider 42 by a bolt 64 so as to prevent the stem connector 60 from detaching from the shaft 44.

Referring to FIG. 1, a stepping motor 66 is secured to the column 38 at the front surface thereof and a hole 65 formed in the column 38. A horizontal output drive shaft 67 of the motor 66 is inserted in the eccentric hole 57 and secured thereto by a key 68.

Thus, when the driving shaft 67 is rotated, the eccentric cam 54 is rotated to axially move the slider 42, stem 30 and valve disc 14 so that the valve disc 14 cuts off the hole 11 of the valve seat 10.

The end of the output shaft 67 is inserted in the elongated hole 48 of the slider 42. The end of the output shaft 67 is inserted in a hole of a shaft 71 and fixed to the shaft 71 by a screw 72. The shaft 72 is rotatably supported by a bearing 70 provided in a hole 69 of the column 39.

A supporting frame 73 is securely mounted on the column 39, a photo sensor 74 is attached to the supporting frame 73. A sensor dog 75 is attached to an end portion of the shaft 71. The photo sensor 74 and the sensor dog 75 are so arranged as to detect the rotating angle of the eccentric cam 54 so that the closing and opening of the hole 11 of the valve seat 10 by the valve disc 14 are detected.

A supporting frame 76 is mounted on the column 39, and a potentiometer 77 is attached to the supporting frame 76. A pulley 78 is secured to the end of the shaft 71, and a pulley 79 is mounted on the shaft of the potentiometer 77. A timing belt 80 is engaged with the pulleys 78 and 79.

Thus, when the eccentric cam 54 is rotated, the shaft of the potentiometer 77 is rotated. Therefore, the rotating angle of the eccentric cam 54 that is the closing condition of the valve seat 10 is detected based on the output of the potentiometer 77. The output of the potentiometer 77 is fed back to the stepping motor 66.

The above described actuator 6 is covered by a cover 81 except for the stepping motor 66.

An outside heater means 82 is provided for covering the outside surface of the valve body 1. The heater means 82 comprises a flat heater 83 and an insulator cover 84. The heater 83 is connected to an electric source by a cable 85, thereby heating the outside of the valve body 1.

An inside heater means 86 is provided between a lower portion of the stem 30 and the bellows 35.

The inside heater means 86 comprises a sheathed wire heater 87 around the stem 30. A thermoelectric couple 88 is provided around a lower portion of the stem 30. Ends of the heater 87 are held on the connector 31 by a washer 89b and a Bélleville spring 90 through a washer 89a. Ends of the thermoelectric couple 88 are held on the washer 89b by the lower end of the stem 30.

A cable 91 connected to the heater 87 is connected to an electric source to heat the valve disc 14 and bellows 35.

The operation of the valve is described hereinafter. In the state of FIGS. 1 and 4, the slider 42, stem connector 60, stem 30, connector 31 and valve disc 14 are elevated by the eccentric cam 54, so that the seal ring 25 and the needle portion 16 are removed from the valve seat 10 and the hole 11, thereby opening the passage 13 to permit gas flow.

When the eccentric cam 54 is rotated about 140 degrees in the clockwise direction in FIG. 4 by the stepping motor 66 through the output shaft 76, the slider 42 is lowered. Therefore, the stem 30 and valve disc 14 are lowered by the Bélleville spring 62 at a constant pressing force, and the heater 87, thermoelectric couple 88 and bellows 35 are extended. Thus, the flow rate adjust surface 23b (FIG. 3) of the needle portion 16 of the valve disc 14 is gradually inserted in the hole 11 of the valve seat 10, so that the flow rate is sequentially controlled. The needle portion 16 is fully inserted in the hole 11 at a predetermined pressure of the Bélleville spring 62 to close the hole, and seal ring 25 is pressed against the valve seat 10 to surely close the valve seat 10. By pressing the seal ring 25 against the valve seat by the constant pressing device of the Bélleville spring 62, The pressing amount of the seal ring can be easily set. Furthermore, even if the seal ring 25 deforms, it is possible to surely close the valve seat 10 at constant valve pressing force.

When the stepping motor 66 is reversely operated and the eccentric cam 54 is rotated about 140 degrees, the stem 30 and the valve disc 14 is upwardly moved by the Bélleville spring 62, and the heater 87, thermoelectric couple 88 and bellows 35 are compressed. Consequently, the seal ring 25 is removed from the valve seat, and the flow rate adjust surface 23b of the needle portion 16 is gradually removed from the wall of the hole 11, thereby sequentially controlling the flow rate of the gas. Thus, the needle portion 16 is removed from the hole 11 to open the passage 13.

The photo sensor 74 detects the opening degree of the hole 11 of the valve seat by the valve disc 14 based on the position of the sensor dog 75, and further the potentiometer 77 also detects the opening degree of the hole 11 based on the angular position of the pulley 79, so that the stepping motor 66 is feed-back controlled, thereby controlling the flow rate of the gas.

As described above, in the valve of the present invention, the cross slider crank mechanism comprising the eccentric cam 54 and slider 42 is employed as an actuator for operating the valve disc 14 in the sine curve motion. Therefore, the valve disc 14 is controlled in the equal percentage characteristic. Consequently, the valve disc can be operated at a high speed in a medium range of the flow rate, and can be operated at a top position of the sine curve in a minimum range, thereby increasing the solving power. Therefore, the valve is possible to softly discharge the gas like the bypass valve.

In addition, it is possible to further increase the solving power by forming the flow rate adjust surface 23b into a spheroid. Furthermore, since the valve disc 14 is softly landed on the valve seat 10, it is possible to reduce the vibration of the valve and the generation of particles.

The valve disc 14 comprises the closing portion 15 and the needle portion 16, so that the single unit performs two functions, that is the flow rate control and the cut off function. Thus, the range-ability becomes large and the control range becomes wide. Therefore, it is possible to perform a wide range pressure control such as process pressure control and cleaning pressure control in the discharge system of the semiconductor manufacturing system.

Since the valve disc 14 is pressed against the valve seat 10 at the bottom dead center of the eccentric cam 14, the reaction force of the valve seat pressing force is hardly changed into the rotation of the eccentric cam. Therefore, the pressure applied to the valve disc for closing the valve seat is kept even if electric power is cut off, so that the gas is prevented from leaking. Thus, it is possible to increase the reliability of the valve. In addition, since the driving circuit can be made the same as the driving circuit of the butterfly valve, it is possible to commonly use a control circuit also.

Since the valve body 1 is heated by the outside heater 82 and the valve disc 14 and the bellows 35 are heated by the inside heater 86, it is possible to prevent byproducts included in the gas from adhering to outside surfaces of the valve disc, bellows and others.

Thus, the valve disc and bellows can be smoothly operated, and the maintenance cost can be reduced.

Dimensions of main parts of the valve of the first embodiment and the range-ability based on the dimensions are described hereinafter.

The diameter of the hole 11 of the valve seat is 70 mm, the length b (FIG. 3) of the flow rate adjust surface 23b of the valve disc 14 is 8 mm, the diameter c of the adjust surface is 70 mm, the diameter d of the top end of the adjust surface is 67.5 mm, the length e between the center of the valve disc 14 and an eccentric point C is 5 mm, the length f (radius) between the eccentric point C and the adjust surface 23b is 40 mm.

As a comparative example, a conventional valve having a linear operation actuator and the same valve mechanism as the first embodiment was provided. As the gas, a general nitrogen gas (purity: over 99.9%) was used, and the conductance to the valve opening degree of the present invention and the comparative example was measured to confirm the operation and the flow rate characteristic of the valves. Furthermore, pressures of the valves were controlled by a controller, and control ranges were measured in a minimum range.

Figure 10:
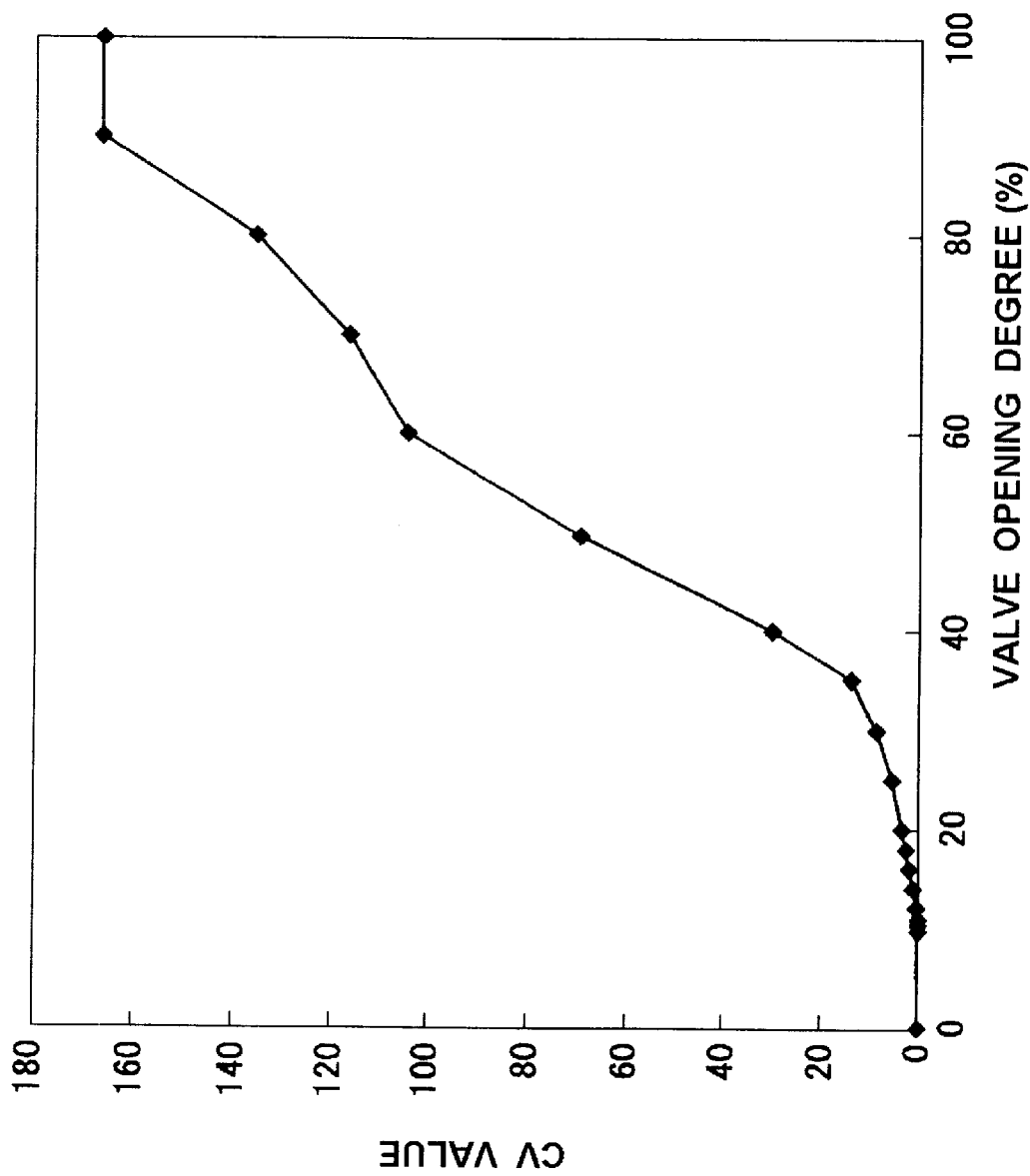
FIG. 10 is a graph showing CV values to the rotating angle of the eccentric cam.
Figure 11:
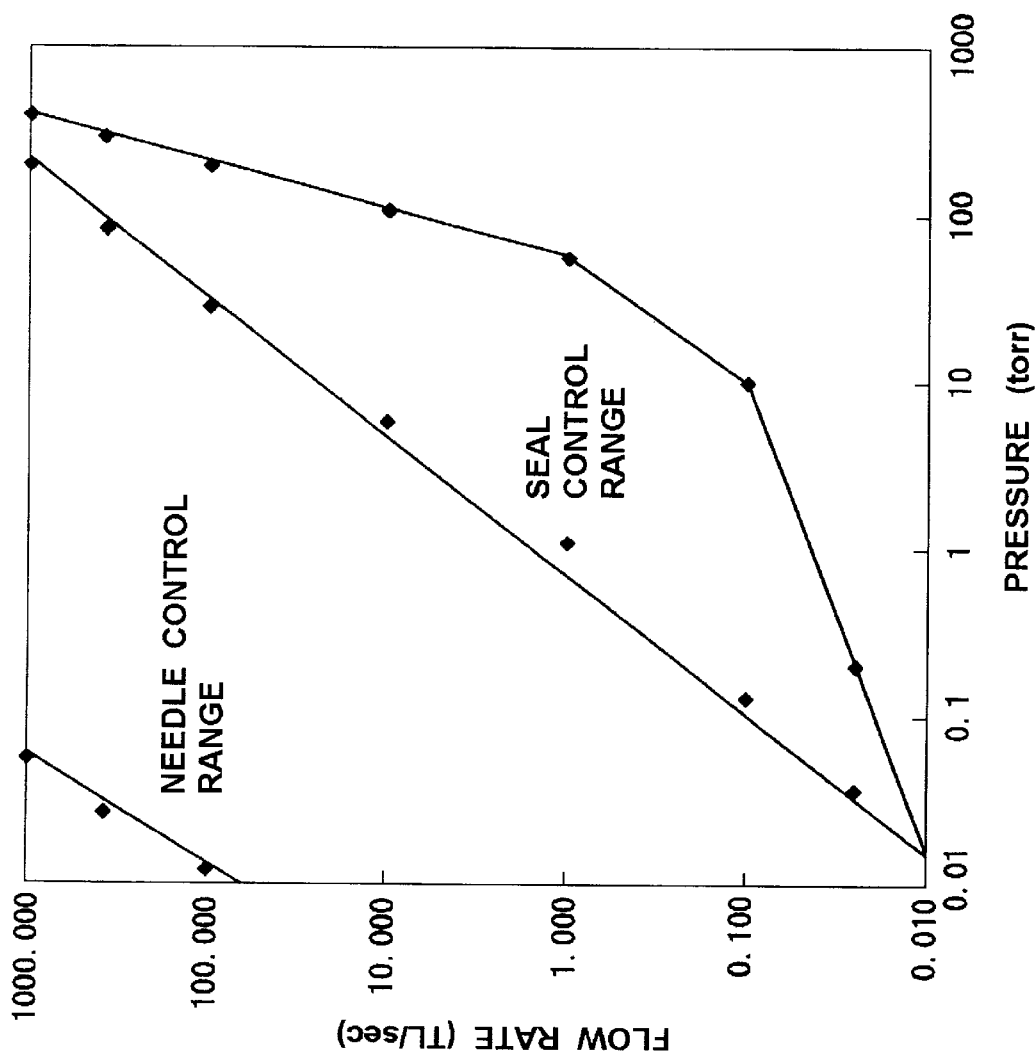
FIG. 11 is a graph showing a control range of the valve of the present invention.

FIG. 10 shows the CV value to the rotating angle of the eccentric cam, and FIG. 11 shows the control range of the valve of the present invention. A control range of a needle control range between the inclined line at left upper portion and the central inclined line, and a control range of the valve seat seal between the central inclined line and the right polygonal line were obtained. On the other hand, FIG. 12 shows the CV value to the valve opening degree in the comparative example.

Figure 12:
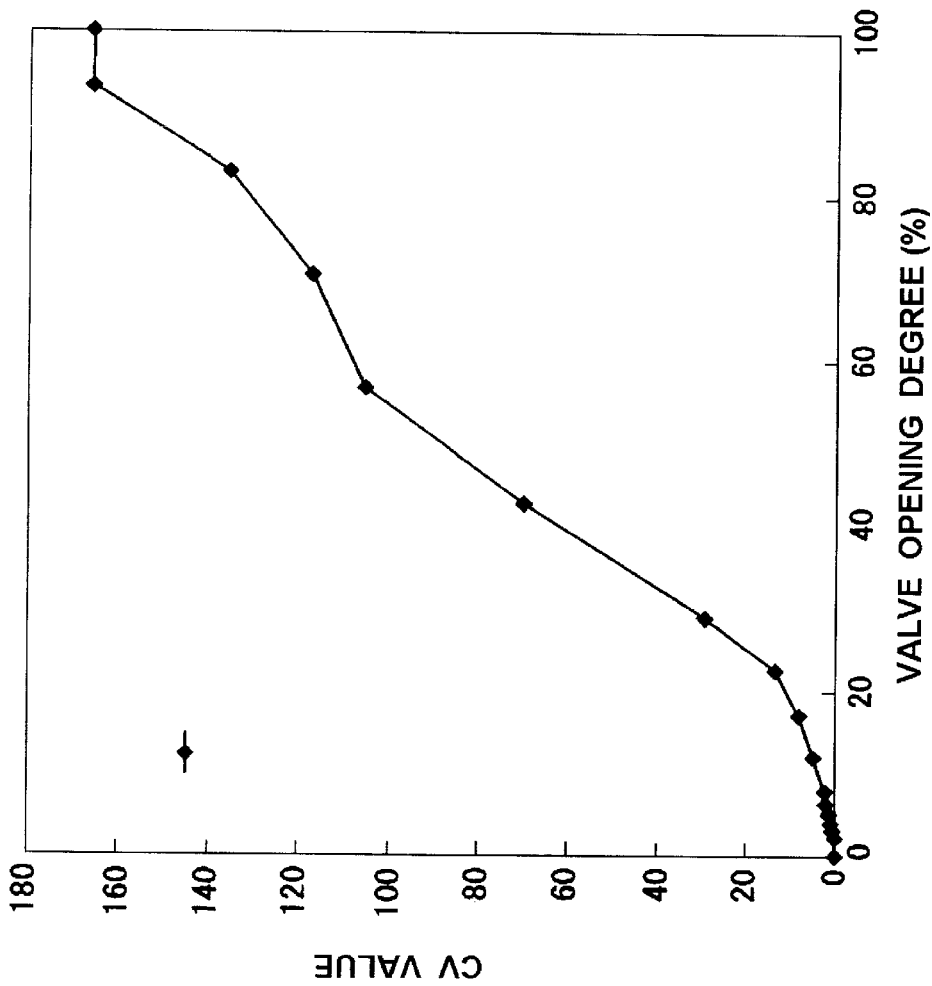
FIG. 12 is a graph showing CV values to the valve opening degree.

In accordance with the embodiment of the present invention, the operating characteristic of the sine curve by the cross slider crank mechanism could be obtained, and the minimum control range becomes wide as shown in FIG. 12. The flow rate could be controlled in the high pressure range (400 torrs) by changing the setting value of the PID (Proportion, Integral, Differential) control, if the accuracy of the set pressure was 2~3%. On the other hand, the leak quantity of the valve seat was smaller than $1 \times 10^{-10}$ Pa·m$^3$/sec).

The range-ability obtained by a maximum and minimum of the CV value is 100~200, and the equal percentage characteristic is 50~100. However, it is possible to control the flow rate even in the valve seat sealing range. The valve has a wide control range (range-ability 200~3000), and superior flow rate control characteristic and minimum control characteristic.

Figure 8:
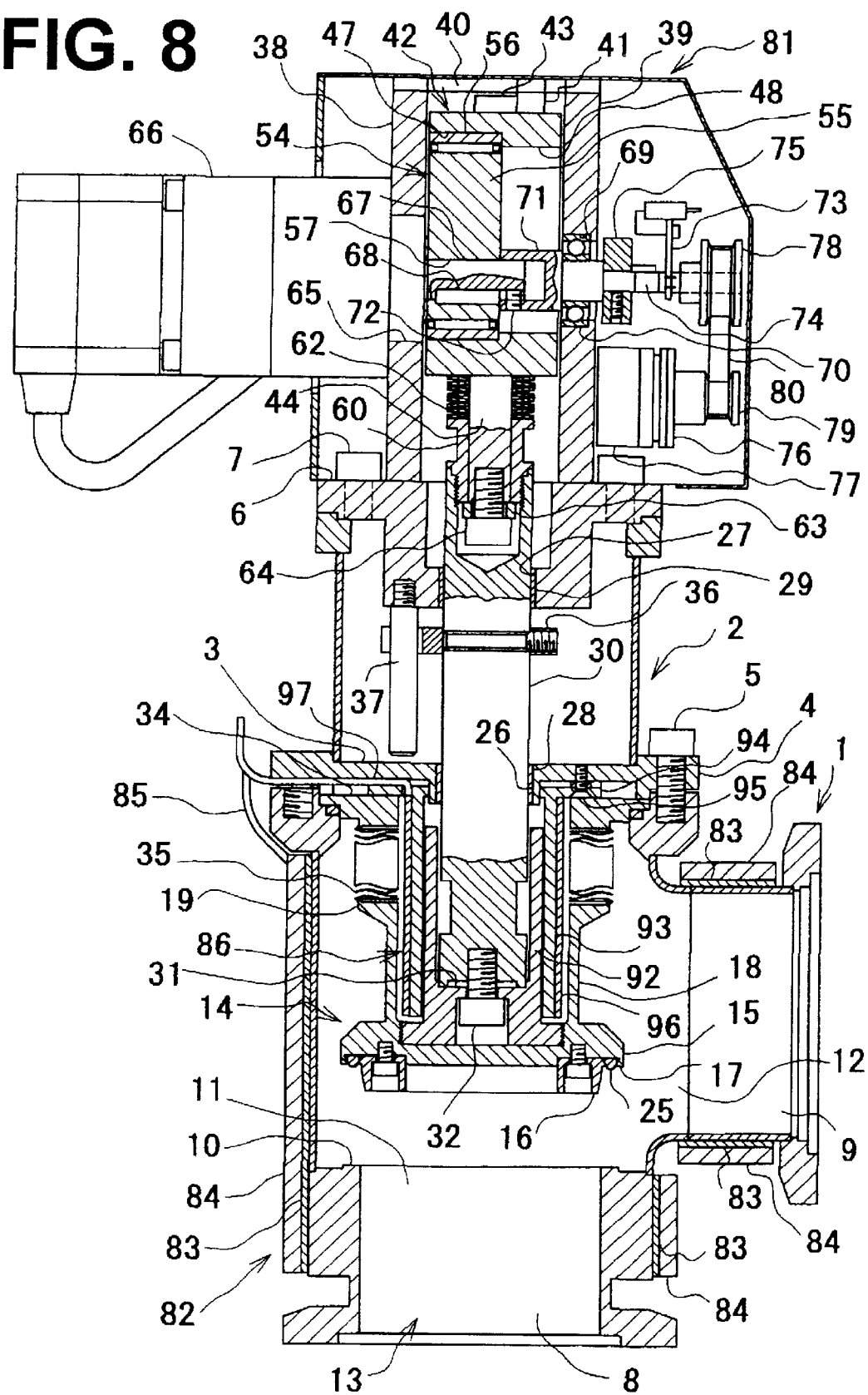
FIGS. 8 and 9 are front views of a second embodiment of the present invention.
Figure 9:
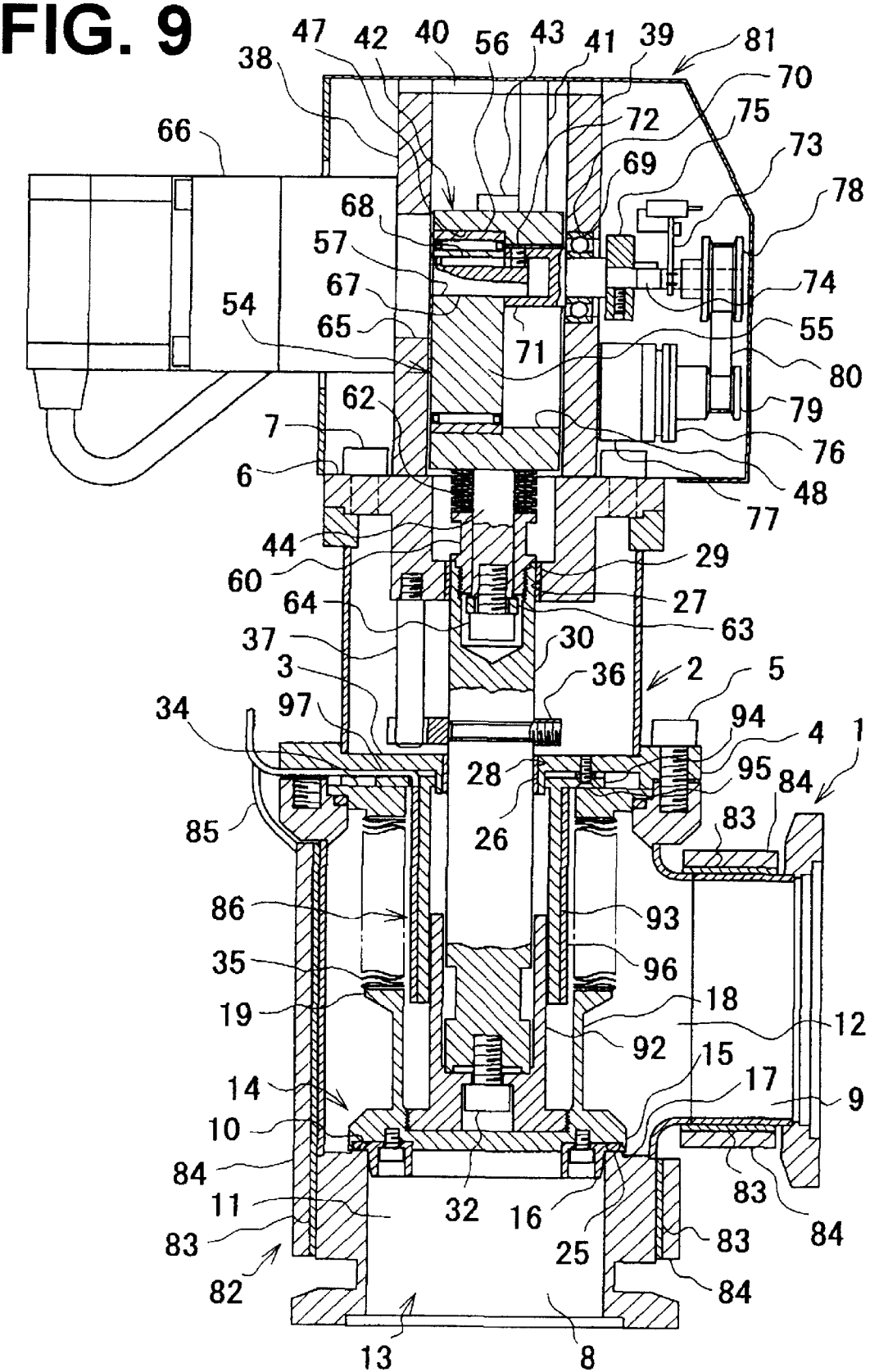

Referring to FIGS. 8 and 9 showing the second embodiment of the present invention, the same parts as the first embodiment are identified with the same reference numerals as the first embodiment, and the description thereof is omitted.

A cylindrical portion 92 is integrally formed on the connector 31, and a flange 94 of a heater sleeve 93 is secured to the bottom plate 3 of the bonnet 2 by screws 95, surrounding the cylindrical portion 92 with a gap therebetween. When the valve is opened, the cylindrical portion 92 is inserted in the heater sleeve 93. If the valve is closed, the cylindrical portion 92 remains in the heater sleeve 93 as shown in FIG. 9. A flat heater 96 similar to the flat heater 83 of the first embodiment is attached on the heater sleeve 93 to provide an outside heater 86. A cord 97 connected to the heater 96 and a cord (not shown) connected to a thermoelectric couple (not shown) are connected to a power source passing through a hole of the flange 94 and a hole of the bottom plate 4.

In accordance with the outside heater 86, the heater sleeve 93 is heated by the flat heater 96, the cylindrical portion 92 and connector 31 are heated by the radiant heat, and further the valve disc 14 is heated.

In the valve closing state, since the entire cylinder portion 92 is inserted in the heater sleeve 93, the valve disc 14 is quickly heated. The bellows 35 is also heated. Therefore, it is possible to prevent byproducts included in the gas from adhering to the inside wall of the valve body 1 and to the outside wall of the valve disc 14 and the bellows 35. In addition the maintenance cost can be reduced.

The seal ring 25 may be provided in the valve seat 10 only. Furthermore, the seal ring can be omitted. In such a case, a constant pressure mechanism having a spring is employed to surely close the valve seat.

In accordance with the present invention, the valve disc is operated in the sine curve motion by the cross slider crank mechanism. Therefore, the valve disc is operated at a high speed in a medium range, and operated at near the top portion of the sine curve in a minimum range. Thus, the solving power can be increased.

Therefore, both high speed operation and the high controllability in a high pressure range are satisfied.

The valve disc is provided with a needle portion and a closing portion, namely a single unit has the flow rate control function and the cut off function. Therefore, the range-ability becomes large and the control range becomes wide. Thus, it is possible to control the process pressure and cleaning pressure.

The cross slider crank mechanism comprises a slider having a recess and an eccentric cam provided in the recess, the hole of the valve disc is closed by the bottom dead center of the eccentric cam. Therefore, the valve is closed in the power cut off state, thereby preventing leakage of the gas.

While the invention has been described in conjunction with preferred specific embodiment thereof, it will be understood that this description is intended to illustrate and not limit the scope of the invention, which is defined by the following claims.

What is claimed is:

1. A valve comprising:

a valve body having a passage including a hole in which gas flows;

a valve seat surrounding a port of the hole;

a stem vertically slidably mounted in the valve body;

a valve disc provided on a lower end of the stem for closing the port of the hole;

a motor having a driving shaft for operating the stem;

a crank mechanism comprising an eccentric cam secured to the driving shaft, a slider, guide means for vertically slidably holding and guiding the slider, the slider being slidably engaged with the eccentric cam so as to be vertically moved;

a constant pressure mechanism having a spring disposed between the stem and the slider;

the stem and the crank mechanism being so arranged that the valve disc is pressed against the valve seat at an approximately bottom dead center through the spring.

2. The valve according to claim 1 wherein the valve disc has a closing portion engaged with the valve seat and a needle portion inserted in the hole in the passage.

3. The valve according to claim 1 further comprising an inside heater for heating the valve disc.

4. The valve according to claim 1 further comprising an outside heater for heating parts of the valve body surrounding the valve seat and the valve disc.

5. The valve according to claim 2 further comprising a seal ring made of elastic material and provided on the closing portion so as to be pressed against the valve seat.

6. The valve according to claim 2 further comprising a seal ring made of elastic material and embedded in the closing portion.

7. The valve according to claim 2 wherein an outside wall of the needle portion has a spheroid.

8. The valve according to claim 1, wherein the constant pressure mechanism comprises a stem connector attached to an end of the stem and slidably mounted in the slider, a spring provided between the slider and the stem connector to urge the stem connector in a valve seat closing direction, and a stopper provided in the slider to stop the stem connector.

* * * * *